United States Patent
Yoder

(10) Patent No.: US 7,058,203 B2
(45) Date of Patent: Jun. 6, 2006

(54) REGION OF INTEREST IDENTIFICATION USING REGION OF ADJACENT PIXELS ANALYSIS

(75) Inventor: Gabriel J. Yoder, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 646 days.

(21) Appl. No.: 10/146,367

(22) Filed: May 14, 2002

(65) Prior Publication Data

US 2003/0215113 A1 Nov. 20, 2003

(51) Int. Cl.
*G06K 9/00* (2006.01)

(52) U.S. Cl. .................. 382/101; 382/176; 382/179; 382/225

(58) Field of Classification Search .............. 382/101, 382/174–180, 182, 184–187, 224, 225, 229, 382/290, 292, 321
See application file for complete search history.

(56) References Cited

U.S. PATENT DOCUMENTS

| | | | |
|---|---|---|---|
| 5,142,589 A | 8/1992 | Lougheed et al. | |
| 5,524,068 A | 6/1996 | Kacandes et al. | |
| 5,625,711 A * | 4/1997 | Nicholson et al. | .......... 382/224 |
| 5,642,442 A | 6/1997 | Morton et al. | |
| 5,737,437 A | 4/1998 | Nakao et al. | |
| 6,014,450 A | 1/2000 | Heilper et al. | |
| 6,236,735 B1 | 5/2001 | Bjorner et al. | |
| 6,343,139 B1 | 1/2002 | Finkelstein et al. | |
| 6,512,849 B1 * | 1/2003 | Yair et al. | .................. 382/202 |
| 2002/0037097 A1 * | 3/2002 | Hoyos et al. | ............... 382/137 |

* cited by examiner

*Primary Examiner*—Joseph Mancuso
*Assistant Examiner*—Craig Kronenthal
(74) *Attorney, Agent, or Firm*—Tarolli, Sundheim, Covell & Tummino L.L.P.

(57) ABSTRACT

A method for determining a region of interest on an object includes the step of producing an image of the object. The method also includes the step of identifying regions of adjacent pixels on the image. The method also includes the step of identifying which of the regions of adjacent pixels are positioned within a predetermined distance of each other on the image. The method also includes the step of grouping in a cluster regions determined as being positioned within a predetermined distance of each other. The method further includes the step of identifying the cluster as a region of interest on the object.

21 Claims, 7 Drawing Sheets

REGION OF INTEREST IDENTIFICATION USING REGION OF ADJACENT PIXELS ANALYSIS

FIELD OF THE INVENTION

The present invention relates to a system and method for identifying a region of interest on an object.

BACKGROUND OF THE INVENTION

There are a variety of applications in which it may be desirable to determine the location of regions of interest on an object. For example, in an optical character recognition (OCR) application, a region of interest may be a text region on a document. Thus, in the OCR application, it may be desirable to distinguish these regions of interest from non-text regions such as pictures, illustrations, etc. This allows the OCR application to focus only on the regions of interest, i.e., the text regions.

Another application in which it may be desirable to determine the location of regions of interest on an object relates to processing parcels of mail. In this application, regions of interest on the parcel include the destination address, return address, and indicia (postage mark, stamp, etc.). Once determined, the regions of interest can be further analyzed to perform functions such as checking postage and sorting/routing the parcels.

SUMMARY OF THE INVENTION

The present invention is directed to a system and method for determining regions of interest on an object. According to one aspect of the present invention, the invention relates to a method including the step of producing an image of the object. The method also includes the step of identifying regions of adjacent pixels on the image. The method also includes the step of identifying which of the regions of adjacent pixels are positioned within a predetermined distance of each other on the image. The method also includes the step of grouping in a cluster regions of adjacent pixels positioned within a predetermined distance of each other. The method further includes the step of identifying the cluster as a region of interest on the object.

According to another aspect of the present invention, the invention relates to a computer product including a portion for producing a image of the object. The computer product also includes a portion for identifying regions of adjacent pixels on the image. The computer product also includes a portion for identifying which of the regions of adjacent pixels are positioned within a predetermined distance of each other on the image. Another portion groups in a cluster regions of adjacent pixels positioned within a predetermined distance of each other. Another portion identifies the cluster as a region of interest on the object.

According to another aspect of the present invention, the invention relates to a system including means for producing a image of the object. The system also includes means for identifying regions of adjacent pixels on the image. The system also includes means for identifying which of the regions of adjacent pixels are positioned within a predetermined distance of each other on the image. The system further includes means for grouping in a cluster regions of adjacent pixels positioned within a predetermined distance of each other. The system also includes means for identifying the cluster as a region of interest on the object.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF AN EMBODIMENT

Figure 1:
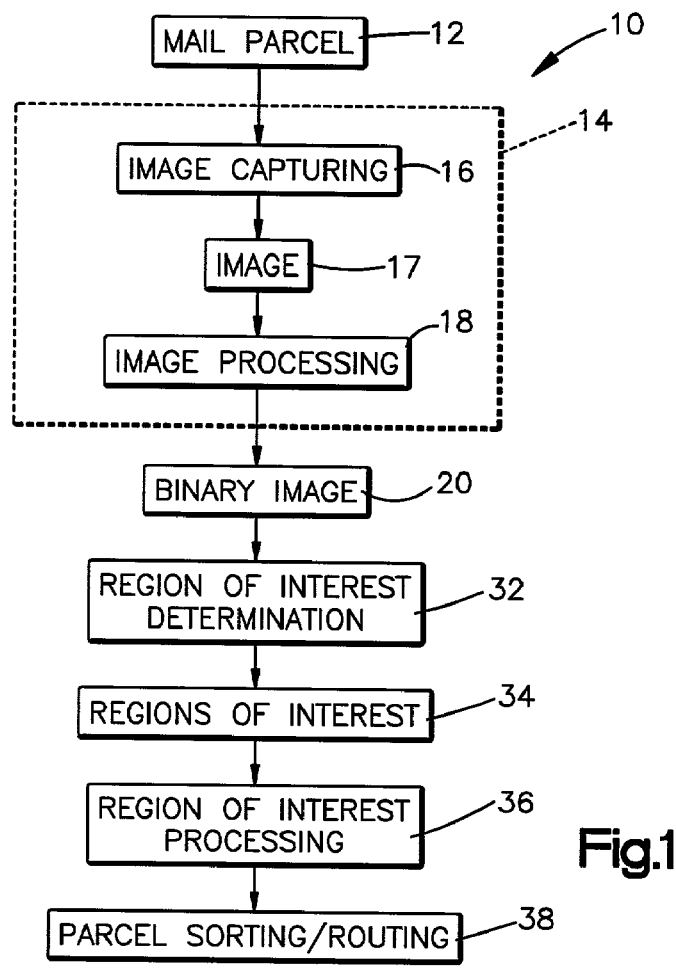
FIG. 1 is a functional block diagram of a system for determining regions of interest on an object, according to an embodiment of the present invention.

The field of the present invention relates to identifying regions of interest on an object. The object may be any object upon which it may be desirable to identify a region of interest. In the illustrated embodiment, the present invention relates to a system and method for determining regions of interest on a mail parcel. FIG. 1 illustrates a system 10 for determining regions of interest on a mail parcel 12.

The system 10 includes an image processor 14 comprising an image capturing portion 16 and an image processing portion 18. The image capturing portion 16 comprises means, such as a digital camera, for capturing a graphical image, indicated at 17, of the mail parcel 12. The mail parcel 12 is presented to the image capturing portion 16 by known means (not shown), such as a conveyor or other mail handling equipment. The image 17 of the mail parcel 12 is captured by the image capturing portion 16 as the parcel passes by. The image 17 is preferably a digital gray-scale image.

The image 17 is provided to the image processing portion 18. The image processing portion 18 performs a known binarization process on the image 17 to convert the image to a binary form. The image processor 14 thus produces a binary image, indicated at 20, of the mail parcel 12. As known in the art, the binary image 20 comprises a two-dimensional digital array of black and white pixels representative of the image 17 from which it was generated.

Figure 6:
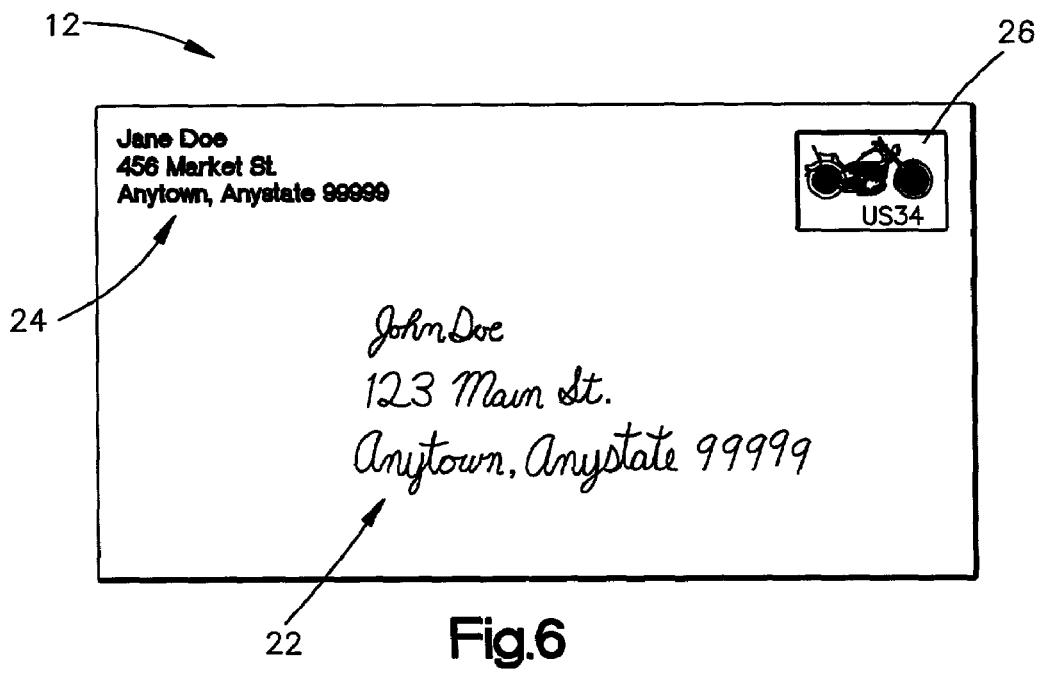
FIG. 6 illustrates an example of an object upon which regions of interest are determined in accordance with the present invention.

The binary image 20 is provided to a region of interest (ROI) determination portion 32 of the system 10. The ROI determination portion 32 is operative to identify regions of interest on the mail parcel 12 by analyzing the data contained in the binary images 20. FIG. 6 illustrates an example of a mail parcel 12 that may be analyzed by the system 10. The mail parcel 12 illustrated in FIG. 6 is that of a typical mailing envelope. The parcel 12 could, however, be any type of parcel, such as a periodical, flyer, package, etc.

Referring to FIG. 6, the regions of interest on the mail parcel 12 are the regions that may include information associated with the destination address 22, return address 24, and indicia 26 of the mail parcels. The term "indicia" is used herein to refer to postal markings such as postage stamps, meter marks, bar codes, or any other type of marking affixed to a mail parcel 12.

The ROI determination portion 32 (FIG. 1) is operative to determine regions of interest 34 on the binary image 20 of the mail parcel 12. The regions of interest 34 are regions on the binary image 20 that may include the destination address 22, return address 24, or indicia 26 of the parcel 12. Once the regions of interest 34 on the binary image 20 are determined, the regions are provided to a ROI processor 36, which is operative to "read" the data in the regions of interest. The ROI processor 36 is also operative to determine if the data includes destination address data, return address data, or indicia data. The ROI processor 36 is further operative to provide the destination address data, return address data, and indicia data to parcel sorting and/or routing equipment 38.

The ROI determination portion 32 of the system 10 may be embodied as a computer program compilable to provide a computer product (i.e., program) executable to determine the regions of interest 34 on the binary image 20. It will thus be appreciated that the system 10 may comprise any computer means suited to provide a platform upon which to execute the computer product of the ROI determination portion 32.

Figure 2:
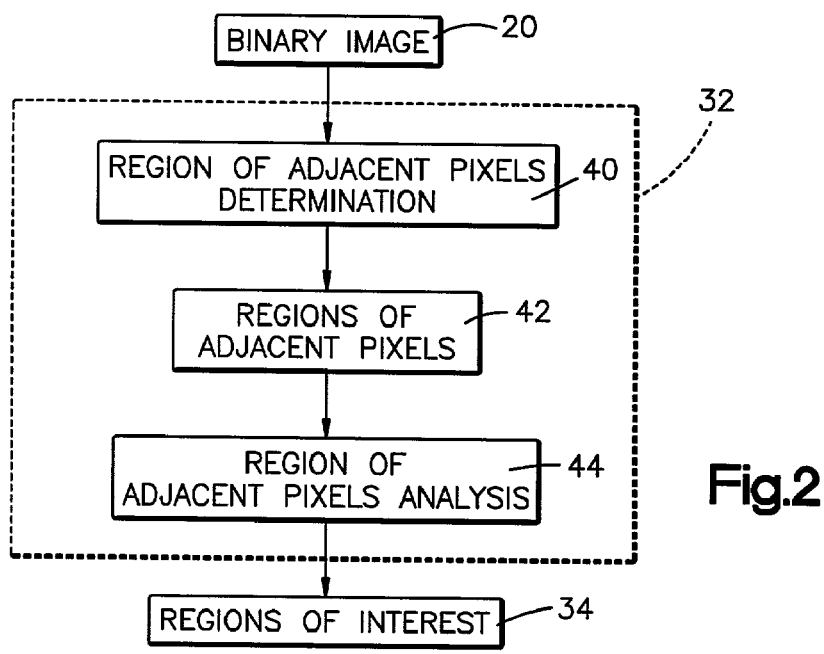
FIG. 2 is a data flow diagram illustrating a process performed by a portion of the system of FIG. 1.

The ROI determination portion 32 identifies the regions of interest 34 through an analysis of the binary images 20 in accordance with a region of adjacent pixels analysis process of the present invention. The ROI determination process 32 is illustrated in FIG. 2. As shown in FIG. 2, the ROI determination portion 32 includes a portion for determining regions of adjacent pixels, indicated at 40. The binary image 20 is provided to the region of adjacent pixels determination portion 40, which is operative to determine regions of adjacent black pixels on the binary image 20. By "regions of adjacent black pixels," it is meant that the image 20 is analyzed to determine groups, i.e., regions, of black pixels wherein each pixel in the group is positioned adjacent to at least one other black pixel in the group. These regions of adjacent black pixels are referred to herein as regions of adjacent pixels, indicated at 42. The process performed by the region of adjacent pixels determination portion 40 will be described in more detail below.

Those skilled in the art will appreciate that it may be desirable to determine the regions of adjacent pixels 42 in a manner other than searching for black pixels per se. For example, it will be appreciated that the binary image 20 may be stored in computer memory as a two-dimensional binary array including a plurality of elements that correspond to pixels in the image. In this instance, an element containing a zero may be associated with a white pixel and an element containing a one may be associated with a black pixel. In this example, the regions of adjacent pixels 42 would be determined by searching the array for adjacent "ones" in the array. Thus, it will be appreciated that the determination of regions of adjacent pixels 42 may comprise the determination of regions of adjacent pixels (or elements) that have a predetermined characteristic.

The regions of adjacent pixels 42 determined by the region of adjacent pixels determination portion 40 are provided to a region of adjacent pixels analysis portion 44 of the ROI determination portion 32. The region of adjacent pixels analysis portion 44 is operative to examine the regions of adjacent pixels 42 to determine the regions of interest 34 on the binary image 20. The process performed by the region of adjacent pixels analysis portion 44 will be described in more detail below.

Figure 3:
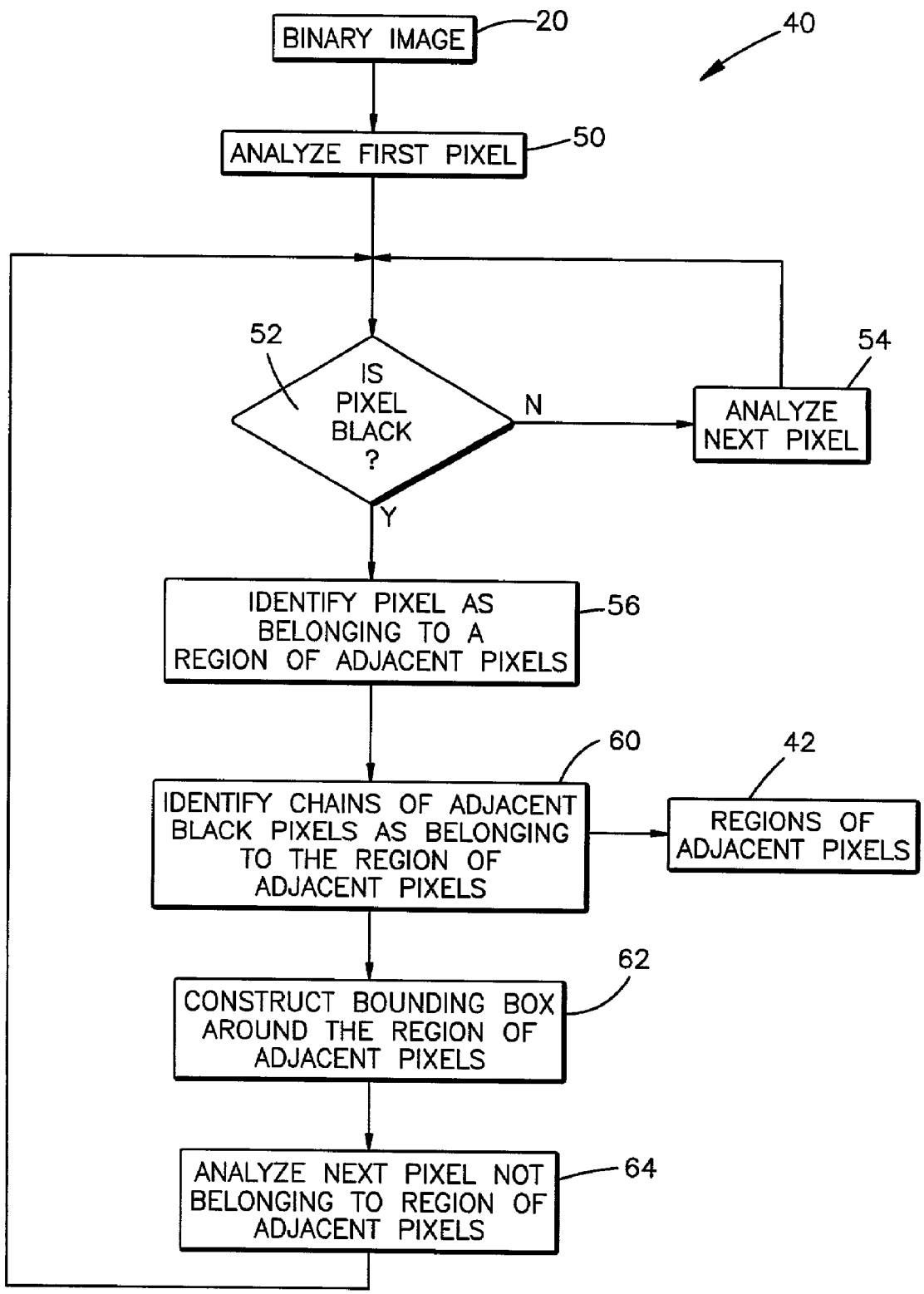
FIGS. 3 and 4 are data flow diagrams illustrating processes performed during different steps of the process of FIG. 2.
Figure 7:
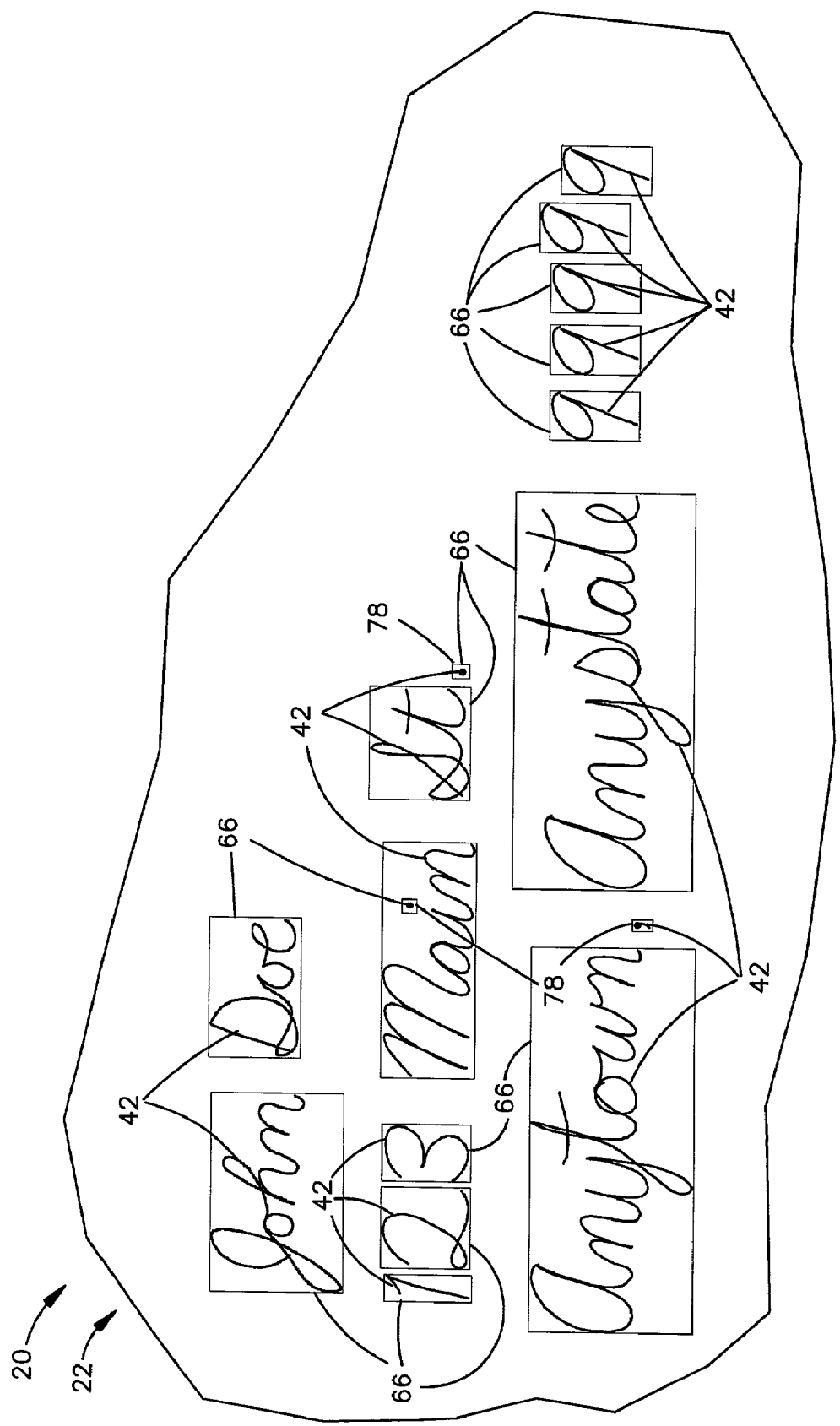
FIG. 7 is an enlarged view of an image of a portion of the object of FIG. 6.

The process performed by the region of adjacent pixels determination portion 40 of the ROI determination portion 32 is illustrated in FIG. 3. In this description of an embodiment of the present invention, the use of the word "step" is used to describe functions performed during the process performed by the region of adjacent pixels determination portion 40. FIG. 7 illustrates a portion of the binary image 20 containing the destination address 22 of the mail parcel 12. The process performed by the region of adjacent pixels determination portion 40 will be described herein with reference to FIGS. 3 and 7.

Referring to FIGS. 3 and 7, at step 50, a first pixel in the binary image 20 is selected for analysis. The pixels in the binary image 20 preferably are scanned in a predetermined order (e.g., left to right and bottom to top) to select the pixels. At step 52, a determination is made as to whether the selected pixel is black. If the selected pixel is not black, the process proceeds to step 54, where the next pixel in the binary image 20 is selected for analysis. The process then proceeds back to step 52 to determine whether the pixel selected at step 54 is black. This continues until a black pixel is encountered. Thus, assuming the pixels in the binary image 20 are scanned from left to right and from bottom to top as viewed in FIG. 7, the first selected black pixel would be near the bottom of the "y" in the word "Anytown."

Upon determining a black pixel, the process proceeds to step 56, where this determined black pixel is identified or "tagged" as belonging to a region of adjacent pixels 42. This identification is unique to each determined region of adjacent pixels so that the region can be distinguished from other regions of adjacent pixels. The process then proceeds to step 60, where chains of adjacent black pixels that include the determined black pixel are identified as belonging to the same region of adjacent pixels 42.

At step 60, any black pixels adjacent the determined black pixel are tagged as belonging to the same region of adjacent pixels as the determined black pixel. The pixels adjacent these newly identified black pixels are then examined and any black pixels are also tagged as belonging to the region of adjacent pixels. This process continues until all of the black pixels in the region of adjacent pixels 42 are determined. Thus, in FIG. 7, the first region of adjacent pixels determined would include the black pixels on the binary image 20 that make up the word "Anytown." Once the region of adjacent pixels 42 are determined, the process then proceeds to step 62.

At step 62, a bounding box 66 (FIG. 7) is constructed around the region of adjacent pixels 42 determined at step 60. The bounding box 66 is rectangular and has dimensions (width and height) just sufficient to enclose the region of adjacent pixels 42 within its bounds. By "just sufficient," it is meant that the length and width are of the smallest magnitude large enough to enclose the region of adjacent pixels 42. The bounding box 66 is aligned with the vertical and horizontal axes of the binary image 20.

Having determined the region of adjacent pixels 42 and the bounding box 66, the process proceeds to step 64, where the next pixel not belonging to any previously determined region of adjacent pixels is selected for analysis. The process then proceeds back to step 52, where a determination is made as to whether the selected pixel is black. The process then proceeds as outlined above to identify all of the regions of adjacent pixels 42 in the binary image 20 and construct bounding boxes 66 around the regions. The identified regions of adjacent pixels 42 and their respective bounding boxes 66 are illustrated in FIG. 7. It will thus be appreciated that the process performed by the region of adjacent pixels determination portion 40 is operative to step sequentially through all of the pixels in the binary image 20 and identify all of the regions of adjacent pixels 42 in the binary image and construct a bounding box 66 around each of the regions of adjacent pixels.

Figure 4:
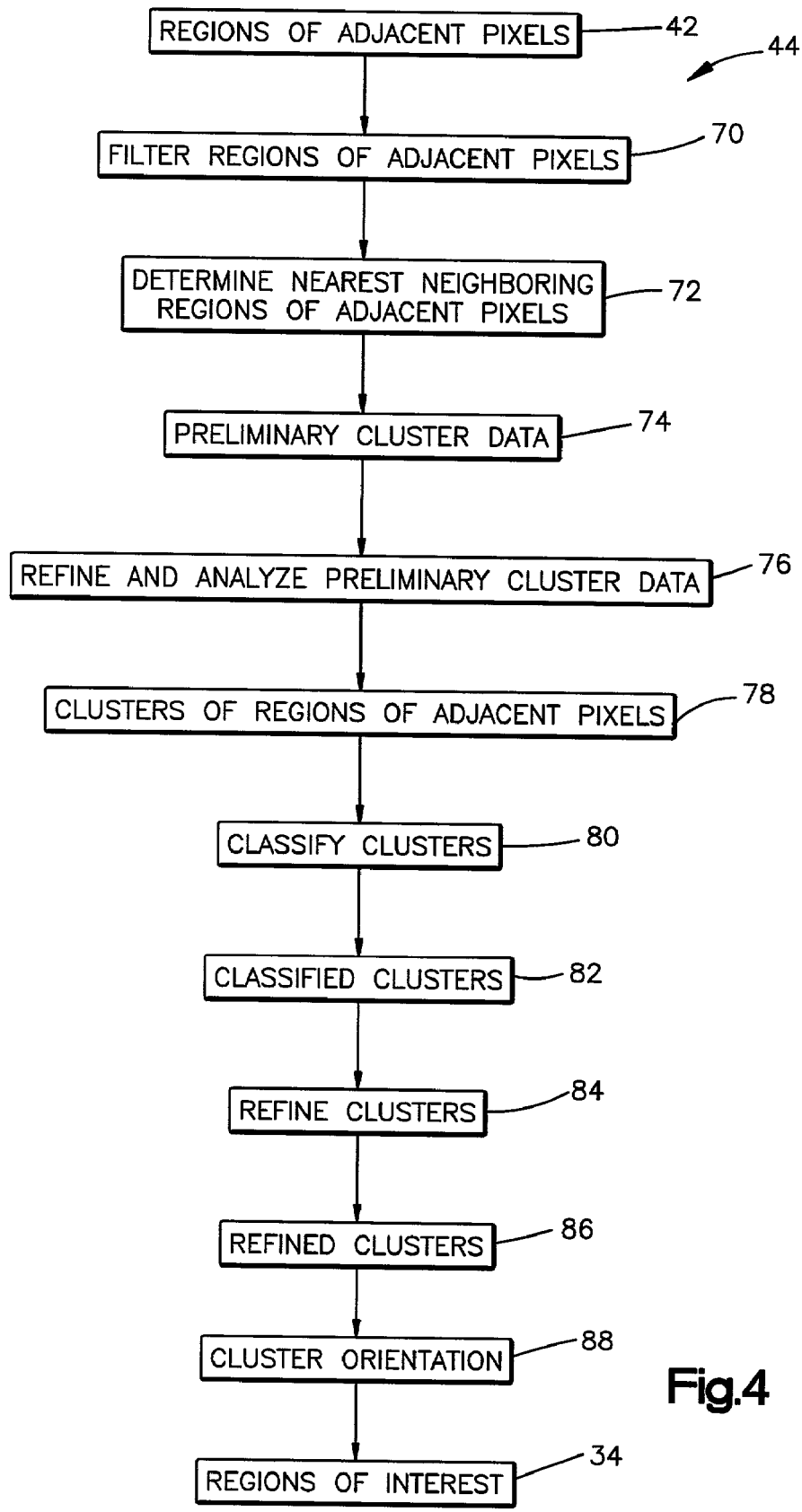

The regions of adjacent pixels 42 identified via the region of adjacent pixels determination process 40 are provided to the region of adjacent pixels analysis portion 44 (FIG. 2) of the ROI determination portion 32. The process performed by the region of adjacent pixels analysis portion 44 is illustrated in FIG. 4. In this description of an embodiment of the present invention, the use of the word "step" is used to describe functions performed during the process performed by the region of adjacent pixels analysis portion 44.

The region of adjacent pixels analysis portion 44 is operative to examine the regions of adjacent pixels 42 on the binary image 20 to determine clusters of regions of adjacent pixels. The clusters are initially determined based on the spatial relationships between the regions of adjacent pixels 42. Once initially determined, the clusters may be refined based on various other determined characteristics of the regions of adjacent pixels 42. These clusters, once identified and refined, are considered the regions of interest 34 on the binary image 20. The process performed by the region of adjacent pixels analysis portion 44 will be described herein with reference to the portion of the binary image 20 of FIG. 7.

Referring to FIGS. 4 and 7, at step 70, the regions of adjacent pixels 42 are filtered to eliminate regions below a predetermined size. The size of the region of adjacent pixels 42 is determined by the area of the bounding box (determined at step 62 in FIG. 3) surrounding the region. Regions of adjacent pixels 42 below the predetermined size are considered to be either insignificant markings on the mail parcel 12 or the result of background noise experienced in capturing/processing the binary image 20. The predetermined size may be selectable or tunable to provide a desired degree of filtration. By way of example, in FIG. 7, the regions of adjacent pixels identified at 78 may be filtered out as being below the predetermined size. The process then proceeds to step 72.

At step 72, nearest neighboring regions of adjacent pixels 42 are determined. This is achieved by examining the distance between the regions of adjacent pixels 42. According to the present invention, the distance between regions of adjacent pixels 42 is determined as the distance between the centers of the respective bounding boxes 66 that surround the regions.

The nearest neighboring regions of adjacent pixels 42 are determined by finding a predetermined number of closest regions for each region of adjacent pixels. For example, the predetermined number of closest regions may be five regions. In this instance, at step 72, the five closest regions of adjacent pixels may be determined for each region of adjacent pixels 42 identified on the image 20. Thus, in FIG. 7, the five neighboring regions 42 closest to the region that includes the word "John" would be the regions of "Doe," "1," "2," "3," and "Main." The five neighboring regions 42 closest to the region that includes the word "Doe" would be the regions of "John," "Main," "St," "3," and "2," and so on.

Each region of adjacent pixels 42 and its predetermined number of closest regions of adjacent pixels are considered as representing potential members in a cluster and are thus recorded as preliminary cluster data, indicated at 74 in FIG. 4. Once the preliminary cluster data 74 (i.e., the identity of each region of adjacent pixels 42 and its predetermined number of closest regions of adjacent pixels) is determined, the process proceeds to step 76.

At step 76, the preliminary cluster data 74 is refined to determine clusters of regions of adjacent pixels, indicated at 78. The preliminary cluster data 74 includes a plurality of records. Each record includes the identity of a region of adjacent pixels 42, the identity of one of its five closest neighboring regions of adjacent pixels, and the distance between the regions. Thus, in the example outlined above, the preliminary cluster data 74 would include five records for each region of adjacent pixels 42 considered at step 72.

The preliminary cluster data 74 is refined at step 76 by eliminating records in the cluster data where the distance between the region of adjacent pixels 42 and its neighboring region of adjacent pixels is larger than a predetermined threshold distance. This helps to prevent one region of adjacent pixels 42 from being identified as belonging to more than one cluster 78. The predetermined threshold distance may be determined as a percentage of the records in the preliminary cluster data 74. For example, records comprising the longest one percent (1%) of recorded distances between regions of adjacent pixels 42 may be eliminated. This may be accomplished, for example, by constructing a histogram of the recorded distances and eliminating the largest one percent (1%) of the distances.

Once the preliminary cluster data 74 is refined, the remaining records are analyzed at step 76 to determine the regions of adjacent pixels 42 included in the cluster 78. This is done by examining the remaining records in the cluster data 74 to determine which regions of adjacent pixels 42 to include in the cluster 78. The remaining records in the cluster data 74 are examined to determine records that share at least one region of adjacent pixels 42 or nearest neighboring region of adjacent pixels. The process, at step 76, thus identifies chains of neighboring regions of adjacent pixels 42 included in the cluster(s) 78 on the image 20. Having identified the clusters 78, the process proceeds to step 80.

At step 80, the clusters 78 are classified as containing machine printed text, handwritten text, or indicia. This classification may be done in any known manner. For example, it will be appreciated that machine printed text and handwritten text each have discernable characteristics (e.g., size, shape, arrangement, uniformity, etc.) that may help to classify a particular cluster as including one or the other. The clusters 78 may thus be classified at step 80 by evaluating these characteristics.

According to the present invention, the clusters 78 are classified by examining each region of adjacent pixels 42 in the cluster. If a region of adjacent pixels 42 appears to include machine printed text, it is tagged as machine printed text. If a region of adjacent pixels 42 appears to include handwritten text, it is tagged as handwritten text. If a region of adjacent pixels 42 appears to include neither machine printed text nor handwritten text, it is tagged as indicia. Once all of the regions of adjacent pixels 42 in a cluster 78 are classified, the cluster itself is classified as including the type of data for which a majority of the regions of adjacent pixels in the cluster were classified. Once the clusters 78 are classified, the process proceeds to step 84.

At step 84, the classified clusters 82 are refined to help better classify the contents of the clusters. There are a variety of refinement processes that may be invoked at step 84. FIGS. 5A–5D illustrate examples of such refinement processes. According to the present invention, all of these refinements may be optional, i.e., the refinement processes of FIGS. 5A–5D may be implemented at step 84 in any combination, including all of the refinement processes or none of the refinement processes. In this description of an embodiment of the present invention, the use of the word "step" is used to describe functions performed during refinement of the classified clusters 82 at step 84 in accordance with the processes of FIGS. 5A–5D.

Figure 5B:
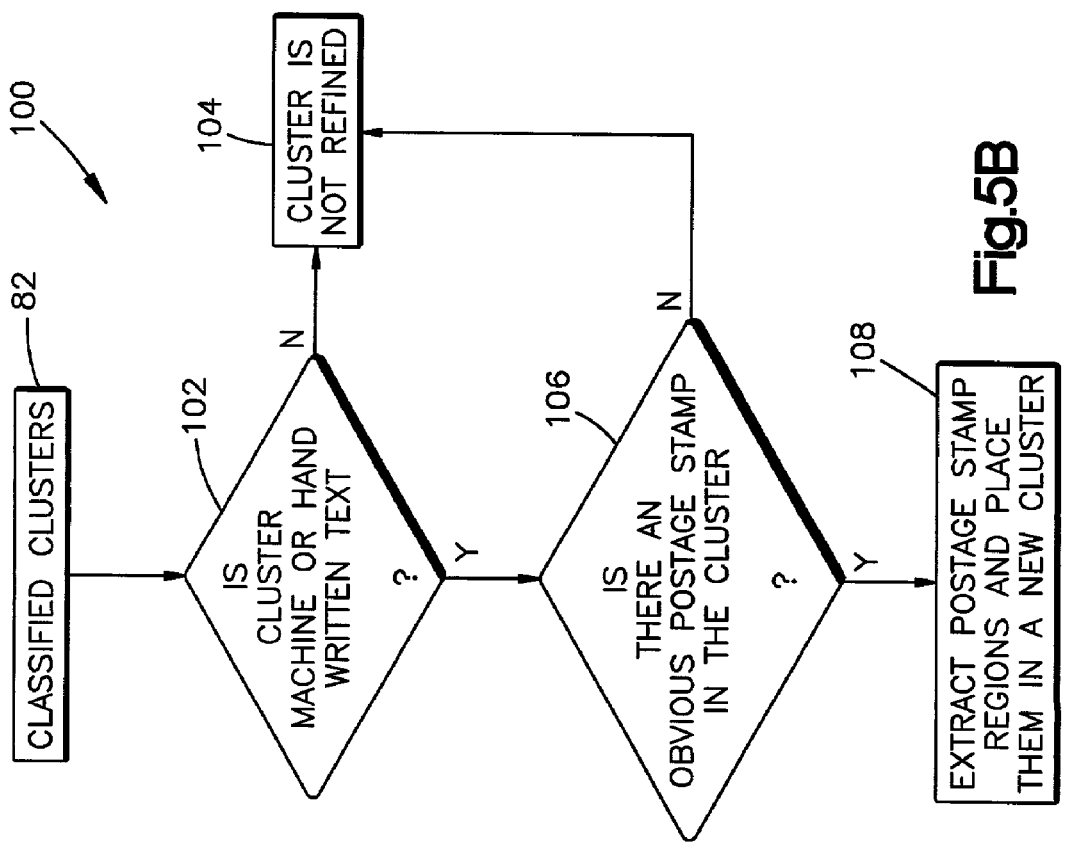
FIGS. 5A–5D are data flow diagrams illustrating processes that may be performed during steps of the process of FIG. 4.
Figure 5A:
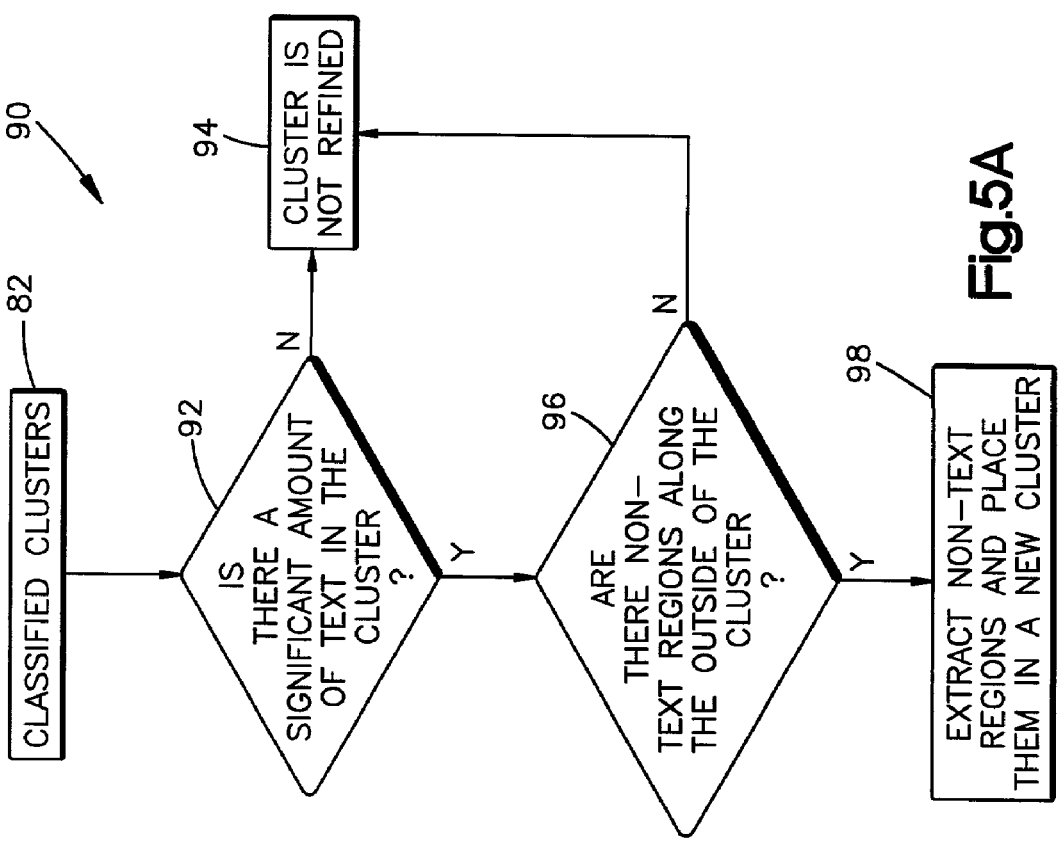

FIG. 5A illustrates a cluster refinement process 90 wherein non-text portions of a classified cluster 82 are separated from text portions of the cluster. At step 92, the classified cluster 82 is analyzed to determine if the cluster contains a significant amount of text, either machine printed or handwritten. This determination is made by evaluating the type of data contained in each region of adjacent pixels 42 of the cluster 82. In the cluster refinement process 90 of FIG. 5A, the classification of the cluster 82 is immaterial, i.e., the cluster is evaluated regardless of whether it has been classified as machine printed text, handwritten text, or indicia.

If the cluster 82 does not contain a significant amount of text, the cluster is not refined, as indicated at 94. If the cluster 82 does contain a significant amount of text, the process 90 proceeds to step 96, where a determination is made as to whether there are any regions of adjacent pixels 42 tagged as being non-text, i.e., indicia, positioned along the outer bounds of the cluster. If there are no non-text regions along the outer bounds, the cluster 82 is not refined, as indicated at 94. If there are non-text regions positioned along the outer bounds, process 90 proceeds to step 98, where the cluster 82 is refined by extracting the non-text regions from the cluster and placing the non-text regions in a new cluster.

FIG. 5B illustrates a cluster refinement process 100 wherein postage stamp indicia of a cluster 82 classified as containing text is separated from the cluster. At step 102, the classification of the cluster 82 is analyzed. If the cluster 82 is not classified as machine or handwritten text, i.e., if the cluster is classified as indicia, the cluster is not refined, as indicated at 104. If the cluster 82 is classified as containing machine printed or handwritten text, the process 100 proceeds to step 106, where a determination is made as to whether the cluster 82 includes regions of adjacent pixels 42 indicative of an obvious postage stamp in the image. If there is no obvious postage stamp in the cluster 82, the cluster is not refined, as indicated at 104. If there is an obvious postage stamp in the cluster 82, the process 100 proceeds to step 108, where the cluster 82 is refined by extracting the postage stamp regions from the cluster and placing the postage stamp regions in a new cluster.

Figure 5D:
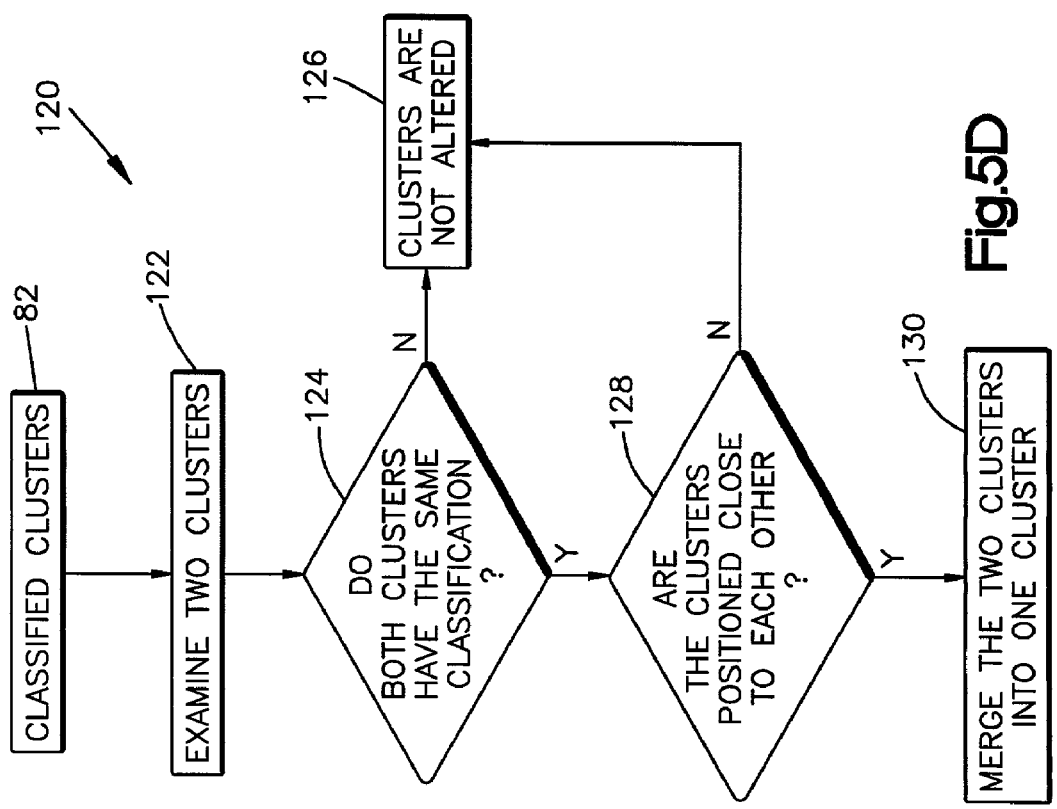
Figure 5C:
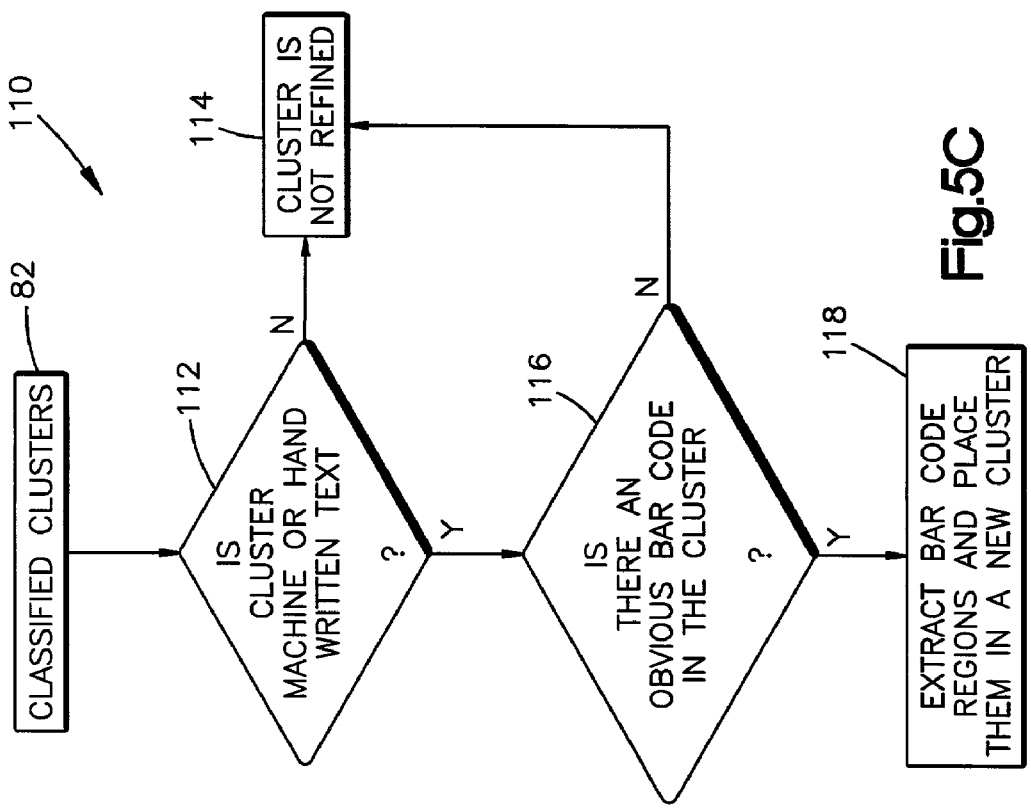

FIG. 5C illustrates a cluster refinement process 110 wherein bar code indicia of a cluster 82 classified as containing text is separated from the cluster. At step 112, the classification of the cluster 82 is analyzed. If the cluster 82 is not classified as machine or handwritten text, i.e., if the cluster is classified as indicia, the cluster is not refined, as indicated at 114. If the cluster 82 is classified as containing machine printed or handwritten text, the process 100 proceeds to step 116, where a determination is made as to whether the cluster 82 includes regions of adjacent pixels 42 indicative of an obvious bar code in the image. If there is no obvious bar code in the cluster 82, the cluster is not refined, as indicated at 114. If there is an obvious bar code in the cluster 82, the process 110 proceeds to step 118, where the cluster 82 is refined by extracting the bar code regions from the cluster and placing the bar code regions in a new cluster.

FIG. 5D illustrates a cluster refinement process 120 wherein clusters 82 having the same classification that are positioned within a predetermined distance of each other are merged. At step 122, a pair clusters 82 are examined. At step 124, a determination is made as to whether the clusters 82 each have the same classification. If the clusters 82 do not have the same classification, the clusters are not refined, as indicated at 126. If the clusters 82 do have the same classification, the process 120 proceeds to step 128, where a determination is made as to whether the clusters 82 are positioned within a predetermined distance of each other. If the clusters 82 are not positioned within the predetermined distance of each other, the clusters are not refined, as indicated at 126. If the clusters 82 are positioned within the predetermined distance of each other, the process 120 proceeds to step 130, where the cluster 82 is refined by merging the two clusters 82 into a single cluster.

Those skilled in the art will appreciate that, depending on the configuration of the system 10, the orientation of the regions of interest 34 on the binary image 20 may vary. This may be the case, for example, where the mail parcels 12 (FIG. 1) are passed by the image processor 14 at varying angles, such as by a conveyor belt that does not align the parcels with respect to the image capturing portion 16. Referring to FIG. 4, the refined clusters 86 generated at step 84 are provided to a cluster orientation portion 88 of the region of adjacent pixels analysis 44. The cluster orientation portion 88 is operative to help adjust orientation of the refined clusters 86 to a more optimal position.

Figure 8:
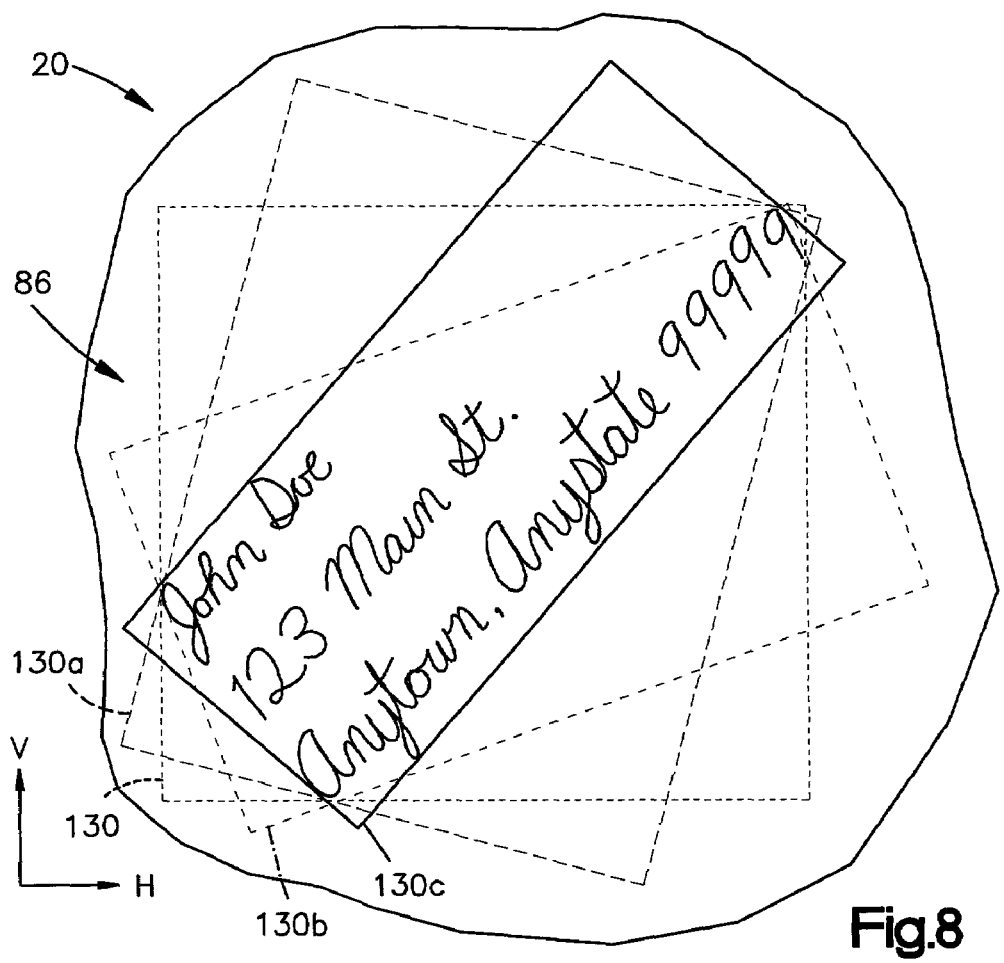
FIG. 8 illustrates the analysis of the image of FIG. 7.

The cluster orientation portion 88 is operative to adjust the orientation of the refined clusters 86 by constructing a rectangular bounding box around the cluster. This is illustrated in FIG. 8. As illustrated in FIG. 8, the cluster 86 is oriented at an angle relative to vertical and horizontal axes, labeled V and H, respectively, of the binary image 20. The cluster orientation portion 88 constructs a bounding box 130 around the cluster 86. The bounding box 130 is initially aligned with the vertical and horizontal axes of the binary image 20. The dimensions of the bounding box 130 are adjusted such that the box is just sufficient to surround the cluster 86. By "just sufficient," it is meant that the length and width are of the smallest magnitude large enough to enclose the cluster 86. The area of the bounding box 130 is then calculated.

In order to determine the orientation of the cluster 86, the bounding box 130 is rotated in angular increments having a predetermined size. Examples of these adjusted angular positions are illustrated in FIG. 8 at 130$a$, 130$b$, and 130$c$. The orientation of the bounding box 130 may be adjusted to any desired number of angular positions (e.g., 1°, 2°, 5°, etc.). At each angular position, the dimensions of the bounding box 130 are adjusted such that the box is just sufficient to surround the cluster 86. The area of the bounding box 130 is then calculated.

Once the area of the bounding box 130 is determined for all of the angular positions, the bounding box having the smallest area is found. The orientation of the cluster 86 is determined to be coincident with the bounding box having the smallest area. By "coincident," it is meant that the vertical and horizontal axes of the cluster 86 are associated with respective ones of the length and width of the smallest area bounding box 130. In FIG. 8, the bounding box indicated at 130$c$ is the bounding box having the smallest area and, thus, the orientation of the cluster 86 is determined to be coincident with this bounding box. The horizontal axis of the cluster 86 extends parallel to the length of the bounding box 130$c$ and the vertical axis of the cluster extends parallel to the width of the bounding box.

Referring to FIG. 4, the clusters 86, being oriented in accordance with the process of step 88, are determined as the regions of interest 34. Referring to FIG. 1, the regions of interest 34, once determined by the ROI determination portion 32 of the system 10, are provided to the ROI processor 36, which determines contents of the regions and provides this data to parcel sorting and/or routing equipment 38.

From the above description of the invention, those skilled in the art will perceive improvements, changes and modifications. Such improvements, changes and modifications within the skill of the art are intended to be covered by the appended claims.

Having described the invention, the following is claimed:

1. A method for determining a region of interest on an object, said method comprising the steps of:
   producing an image of the object;
   identifying regions of adjacent pixels having a predetermined characteristic on the image;
   classifying said regions of adjacent pixels as being a text region or a non-text region;
   identifying a cluster of said regions of adjacent pixels that are positioned within a predetermined distance of each other on the image;
   classifying said cluster as being a text cluster or a non-text cluster based on which of the text regions and non-text regions comprise the greatest number of regions in the cluster; and
   identifying said cluster as a region of interest on the object.

2. The method recited in claim 1, wherein said image comprises a binary image, said step of identifying regions of adjacent pixels having a predetermined characteristic comprising the steps of:
   identifying a first black pixel on the binary image;
   associating said first black pixel with a region of adjacent pixels; and
   identifying black pixels in any chain of adjacent black pixels that includes said first black pixel as being part of said region of adjacent pixels.

3. The method recited in claim 1, wherein said step of identifying which of said regions of adjacent pixels are positioned within a predetermined distance of each other comprises the steps of:
   determining distances between said regions of adjacent pixels; and
   for each region of adjacent pixels, determining a predetermined number of closest neighboring regions of adjacent pixels;
   said step of identifying a cluster comprising the steps of identifying regions of adjacent pixels having in common at least one of said predetermined number of closest neighboring regions of adjacent pixels and placing the identified regions in said cluster.

4. The method recited in claim 3, further comprising the step of removing from said cluster regions of adjacent pixels that are positioned beyond a predetermined distance from all other regions of adjacent pixels in said cluster.

5. The method recited in claim 3, wherein said step of determining distances between said regions of adjacent pixels comprises the steps of:
   constructing a rectangular bounding box around each of said regions of adjacent pixels, each of said bounding boxes having a length and a width just sufficient to surround its respective region of adjacent pixels; and
   determining the distance between the centers of the respective bounding boxes.

6. The method recited in claim 1, wherein:
   said step of classifying said regions comprises classifying said regions as being one of a machine printed text region, a handwritten text region, and an indicia region; and
   said step of classifying said cluster comprises classifying said cluster as one of a machine printed text cluster, a handwritten text cluster, and an indicia cluster, said cluster being classified according to the classification associated with the greatest number of regions of adjacent pixels in said cluster.

7. The method recited in claim 6, further comprising at least one of the steps of:

refining machine printed text clusters and handwritten text clusters to remove indicia regions from an outer periphery of said machine printed text clusters and handwritten text clusters;
refining machine printed text clusters and handwritten text clusters to remove indicia indicative of one of a postage stamp or a bar code; and
refining said clusters to merge two clusters having the same classification when the two clusters are positioned within a predetermined distance of each other.

8. The method recited in claim 1, further comprising the steps of:
   constructing a rectangular bounding box around a cluster, each bounding box having a length and a width just sufficient to surround the cluster;
   calculating the area of the bounding box;
   adjusting the rotational position of said bounding box to a predetermined number of rotational positions;
   adjusting the length and width of said bounding box at each of said rotational positions so that said bounding box is just sufficient to surround said cluster;
   calculating the area of said bounding box at each of said rotational positions after said length and width have been adjusted; and
   identifying the orientation of said cluster as being coincident with the length and width of said bounding box at a rotational position wherein the area of said bounding box is the smallest.

9. A computer product embodied in a computer readable medium for determining a region of interest on an object, said computer product comprising:
   a portion for producing an image of the object;
   a portion for identifying regions of adjacent pixels having a predetermined characteristic on the image;
   a portion for classifying said regions of adjacent pixels as being a text region or a non-text region;
   a portion for identifying a cluster of said regions of adjacent pixels that are positioned within a predetermined distance of each other on the image;
   a portion for classifying said cluster as being a text cluster or a non-text cluster based on which of the text regions and non-text regions comprise the greatest number of regions in the cluster; and
   a portion for identifying said cluster as a region of interest on the object.

10. The computer product recited in claim 9, wherein said image comprises a binary image, said portion for identifying regions of adjacent pixels having a predetermined characteristic comprising:
    a portion for identifying a first black pixel on the binary image;
    a portion for associating said first black pixel with a region of adjacent pixels; and
    a portion for identifying black pixels in any chain of adjacent black pixels that includes said first black pixel as being part of said region of adjacent black pixels.

11. The computer product recited in claim 9, wherein said portion for identifying which of said regions of adjacent pixels are positioned within a predetermined distance of each other comprises:
    a portion for determining distances between said regions of adjacent pixels; and
    a portion for determining a predetermined number of closest neighboring regions of adjacent pixels for each region of adjacent pixels;
    said portion for identifying a cluster comprising a portion for identifying regions of adjacent pixels having in common at least one of said predetermined number of closest neighboring regions of adjacent pixels and a portion for placing the identified regions in said cluster.

12. The computer product recited in claim 11, further comprising the a portion for removing from said cluster regions of adjacent pixels that are positioned beyond a predetermined distance from all other regions of adjacent pixels in said cluster.

13. The computer product recited in claim 11, wherein said portion for determining distances between said regions of adjacent pixels comprises:
a portion for constructing a rectangular bounding box around each of said regions of adjacent pixels, each of said bounding boxes having a length and a width just sufficient to surround its respective region of adjacent pixels; and
a portion for determining the distance between the centers of the respective bounding boxes.

14. The computer product recited in claim 9, wherein:
said portion for classifying said regions comprises a portion for classifying said regions as being one of a machine printed text region, a handwritten text region, and an indicia region; and
said portion for classifying said cluster comprises classifying said cluster as one of a machine printed text cluster, a handwritten text cluster, and an indicia cluster, said cluster being classified according to the classification associated with the greatest number of regions of adjacent pixels in said cluster.

15. The computer product recited in claim 14, further comprising at least one of:
a portion for refining machine printed text clusters and handwritten text clusters to remove indicia regions from an outer periphery of said machine printed text clusters and handwritten text clusters;
a portion for refining machine printed text clusters and handwritten text clusters to remove indicia indicative of one of a postage stamp or a bar code; and
a portion for refining said clusters to merge two clusters having the same classification when the two clusters are positioned within a predetermined distance of each other.

16. The computer product in claim 9, further comprising:
a portion for constructing a rectangular bounding box around a cluster, each bounding box having a length and a width just sufficient to surround the cluster;
a portion for calculating the area of the bounding box;
a portion for adjusting the rotational position of said bounding box to a predetermined number of rotational positions;
a portion for adjusting the length and width of said bounding box at each of said rotational positions so that said bounding box is just sufficient to surround said cluster;
a portion for calculating the area of said bounding box at each of said rotational positions after said length and width have been adjusted; and
a portion for identifying the orientation of said cluster as being coincident with the length and width of said bounding box at a rotational position wherein the area of said bounding box is the smallest.

17. A system for determining a region of interest on an object, said system comprising:
means for producing an image of the object;
means for identifying regions of adjacent pixels having a predetermined characteristic on the image;
means for classifying said regions of adjacent pixels as being a text region or a non-text region;
means for identifying a cluster of said regions of adjacent pixels that are positioned within a predetermined distance of each other on the image;
means for classifying said cluster as being a text cluster or a non-text cluster based on which of the text regions and non-text regions comprise the greatest number of regions in the cluster; and
means for identifying said cluster as a region of interest on the object.

18. The system recited in claim 17, wherein said image comprises a binary image, said means for identifying regions of adjacent pixels comprising:
means for identifying a first black pixel on the binary image;
means for associating said first black pixel with a region of adjacent pixels; and
means for identifying black pixels in any chain of adjacent pixels that includes said first black pixel as being part of said region of adjacent pixels.

19. The system as recited in claim 17 wherein said means for identifying which of said regions of adjacent pixels are positioned within a predetermined distance of each other comprises:
means for determining distances between said regions of adjacent pixels; and
means for determining a predetermined number of closest neighboring regions of adjacent pixels for each region of adjacent pixels;
said means for classifying said cluster comprising means for grouping regions of adjacent pixels having in common at least one of said predetermined number of closest neighboring regions of adjacent pixels.

20. The system recited in claim 17, further comprising:
means for constructing a rectangular bounding box around a cluster, said bounding box having a length and a width just sufficient to surround the cluster;
means for adjusting the rotational position of said bounding box to a predetermined number of rotational positions;
means for adjusting the length and width of said bounding box at each of said rotational positions so that said bounding box is just sufficient to surround said cluster;
means for calculating the area of said bounding box at each of said rotational positions; and
means for identifying the orientation of said cluster as being coincident with the length and width of said bounding box at a rotational position wherein the area of said bounding box is the smallest.

21. A method for determining the orientation of a region of interest in an image, the method comprising the steps of:
determining a region of interest in an image;
constructing a rectangular bounding box around said region of interest, each bounding box having a length and a width just sufficient to surround the region of interest;
calculating the area of the bounding box;
adjusting the rotational position of said bounding box to a predetermined number of rotational positions;
adjusting the length and width of said bounding box at each of said rotational positions so that said bounding box is just sufficient to surround said region of interest;
calculating the area of said bounding box at each of said rotational positions after said length and width have been adjusted; and
identifying the orientation of said region of interest as being coincident with the length and width of said bounding box at a rotational position wherein the area of said bounding box is the smallest.

* * * * *